United States Patent [19]
Goldstein

[11] Patent Number: 6,126,888
[45] Date of Patent: Oct. 3, 2000

[54] METHOD FOR MAKING STRONG MANTLES AND OTHER CERAMIC STRUCTURES

[75] Inventor: Mark K. Goldstein, Del Mar, Calif.

[73] Assignee: Quantum Group Inc., San Diego, Calif.

[21] Appl. No.: 09/227,993

[22] Filed: Jan. 8, 1999

Related U.S. Application Data

[60] Provisional application No. 60/070,880, Jan. 9, 1998.

[51] Int. Cl.[7] ..................................................... B28B 1/00
[52] U.S. Cl. ..................... 264/610; 264/29.6; 264/628; 264/632; 264/658; 264/621; 431/100; 501/80
[58] Field of Search ................... 264/29.6, 610, 264/628, 632, 658, 221, 621

[56] References Cited

U.S. PATENT DOCUMENTS

| | | |
|---|---|---|
| 3,663,182 | 5/1972 | Hemling . |
| 5,240,407 | 8/1993 | Diederich et al. ........................ 264/221 |
| 5,356,487 | 10/1994 | Goldstein et al. ........................ 431/100 |
| 5,662,737 | 9/1997 | Chen ................................... 106/287.18 |
| 5,686,368 | 11/1997 | Wong ....................................... 501/152 |
| 5,711,661 | 1/1998 | Kushch et al. ............................ 431/329 |
| 5,837,011 | 11/1998 | Wong ........................................... 8/181 |

*Primary Examiner*—James Derrington
*Attorney, Agent, or Firm*—Christie, Parker & Hale, LLP

[57] ABSTRACT

A method for making very strong gas mantles and other ceramic structures, and the resulting products, are provided. According to the method, an organic or composite structure is first pyrolyzed in the absence of oxygen to remove hydrogen, oxygen and nitrogen, leaving a porous carbon or composite structure, which is then impregnated with a metal compound-containing solution or slurry which is later fired in the presence of an oxidizing atmosphere to produce a refractory metal oxide which has about the same shape as the precursor carbon or composite structure. Due to minimal shrinkage of the mostly carbon or composite precursor, the resulting mantles and other ceramic structures have few defects in the fibers and great strength.

12 Claims, 5 Drawing Sheets

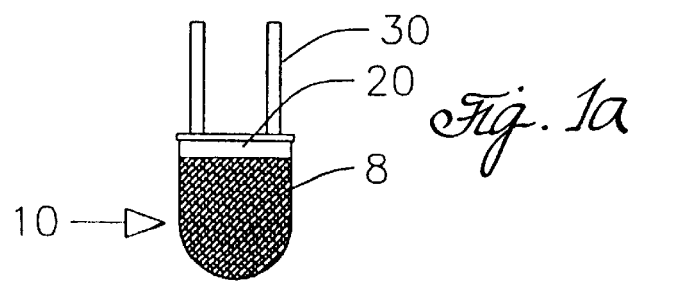
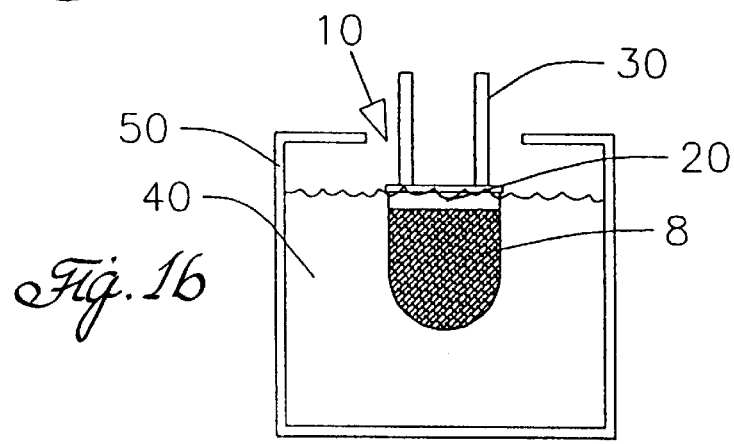
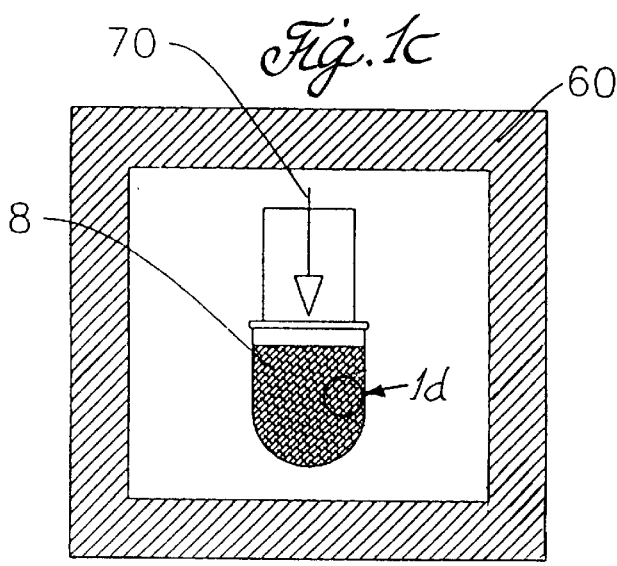
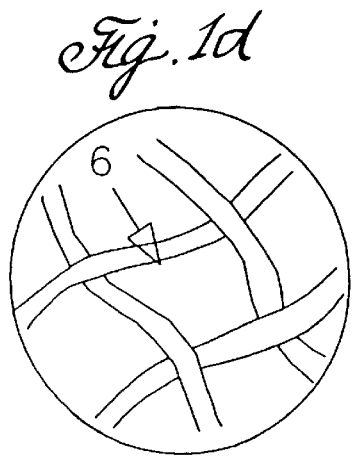

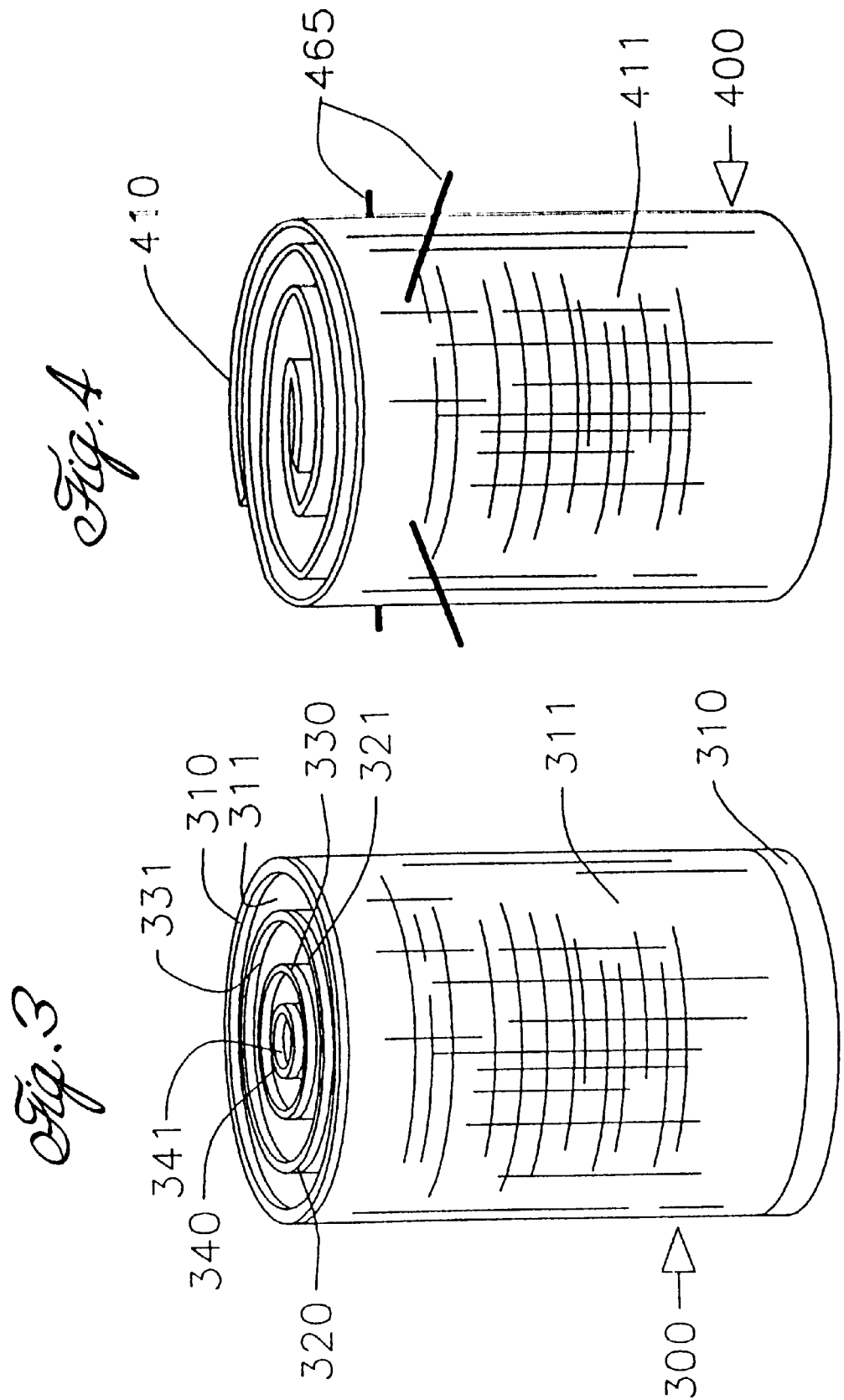

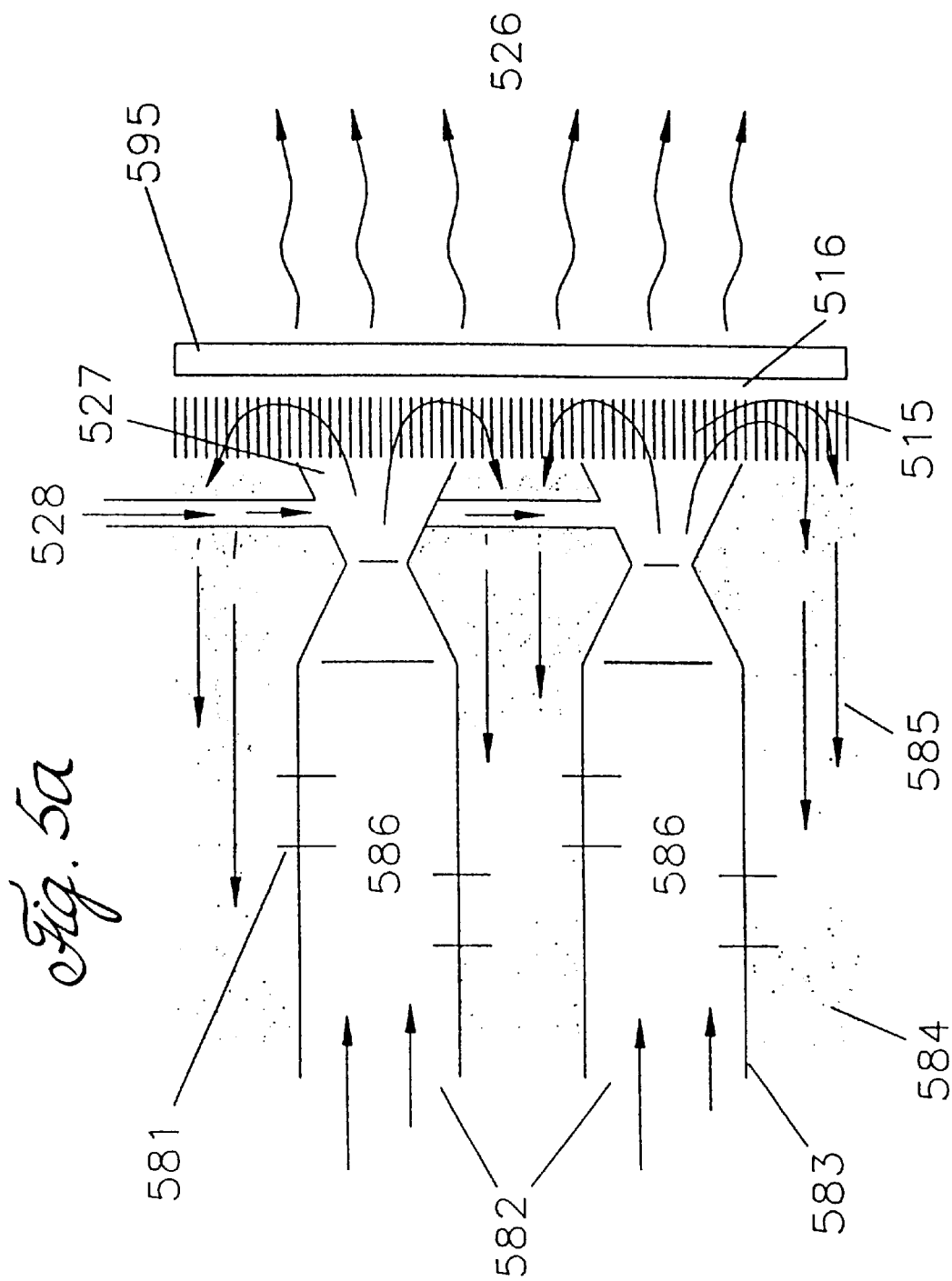

METHOD FOR MAKING STRONG MANTLES AND OTHER CERAMIC STRUCTURES

This application claims the benefit of U.S. Provisional application Ser. No. 60/070,880, filed Jan. 9, 1998.

BACKGROUND OF THE INVENTION

This invention relates to very strong gas mantles and other ceramic structures prepared by a relic-type process which first at least partially pyrolyzes the organic portion of the precursor structure before imbibing the primarily carbon based structure with refractory oxide forming materials.

Light producing mantles have been produced since the 1800s using a simple relic process, i.e., imbibing silk or similar organic fibrous organic structures with metal salts or organometallic compounds and then processing and burning out the organic materials to form ceramic structures. Carl Auer von Wellesbach impregnated yarns woven into sleeves to produce gas light mantles containing thoria and 1 to 2% ceria. When these mantles are heated by a flame they provide a white light source of photons with only a small IR component.

In more recent times (the early 1980s), Goldstein (U.S. Pat. No. 4,793,799) and Nelson (U.S. Pat. No. 4,584,426) developed ytterbia based mantles using somewhat different technologies to produce narrow selected bands of photons in the 980 nanometer (nm) range and also in the 7000 to 10000 nm range. These selected emitters are potentially useful for a number of applications including thermophotovoltaics. The strength of mantles made by these processes have been a problem. In the 1990 several patents have appeared to address the strength issues of photon emitting systems, e.g., U.S. Pat. Nos. 4,776,895, 4,883,619, 4,906,178, 4,975,044, 5,240,407, 5,281,131, 5,356,487, and 5,503,685.

More recently Eva Wong made a major advance in strong ceramic textiles relics and submitted a patent application Ser. No. 08/571,605, entitled "Fibrous Metal Oxide Textiles for Spectral Emitters" filed Dec. 13, 1995. K. C. Chen, filed a patent application Ser. No. 08/645,105 on May 13, 1996 entitled "Method for Making Rare Earth Metal Oxide Ceramic Precursor Compounds and Use Thereof". Dr. Chen prepared organometallic compounds and then spun them in the form of monofilament polymers which are later converted to the oxide structure of very sturdy construction. It is part of this novel invention to use the organometallic compounds prepared by Chen or similarly prepared organometallic compounds to either imbibe pyrolyzed, partially pyrolyzed or normal polymer structure made from such as rayon fibers, sponges, as well as other textiles, and then processing and burning out all of the organic materials to form ceramic structures or to use the organometallic compounds to coat the impregnated porous structure, or to coat a composite component with low emissivity such as alumina fibers.

Currently there are no selective emitter system in wide commercial use other than white light emitters and therefore there is a need for a low cost ceramic emitter systems capable of producing one or more selected bands of radiation.

SUMMARY OF THE INVENTION

This ceramic structure invention provides a method and product made by first pyrolyzing an organic or composite structure in absence of oxygen to remove the hydrogen, oxygen and nitrogen, leaving a porous carbon or composite structure which is then impregnated with a metal compound-containing solution or slurry which is later fired in the presence of oxidizing atmosphere to produce a refractory metal oxide structure which has about the same shape as the precursor carbon or composite structure. Because there is very little shrinkage of the mostly carbon or composite precursor there are fewer defects in the fibers and therefore mantles and other ceramic structures having greater strength are produced by this method. This method is also more easily controlled and scaled, leading to significant economic advantages.

For example, one first forms organic shapes, structures or composites of organic material woven or mixed with ceramic fibers or other ceramic fillers. Once formed and shaped by winding, braiding, knitting, foaming, casting, slip casting, vacuum forming, construction assembly of smaller components, etc., then the structures are subjected to heat in a non oxidizing atmosphere to cause the pyrolysis of the organic components. The pyrolyzed organic or composite structures are then imbibed with rare earth salts or organometallic compounds and fired in oxygen to produce a variety of self-supporting shapes such as gas mantles, matrices, tubes, cones or boxes, as well as many other shapes and structures. These objects have more strength than previous objects made by conventional relic methods, for example, gas mantles, that imbibe the rayon before pyrolysis.

These precursor structures include permeable sponges, fiber mantles, as well as three dimensional structures as described in three Patent applications on the subject of emissive matrix combustion systems, i.e., Ser. Nos. 60/022,437, Filed Aug. 6, 1996, 08/482,217 Filed Jun. 7, 1995, and 08/237,306; Filed May 3, 1994.

Mantle Technology

The process comprises imbibing pyrolyzed organic structures that produce a variety of self supporting shapes such as gas mantles. These mantles have more strength than previous mantles. It is well known that gas mantles made by currently available technology are damaged easily by shock loads of 800 g's after firing for a period of several hours. The use of three dimensional knitted (braided or woven) precursors creates a carbon or composite structure of fibers, sponge like structures, burner emissive structures, etc., that can survive the 4 foot drop test and the 800 g's shock load test force applied to unsupported mantle by rapid deceleration), where g is the acceleration due to gravity. The imbibed structures are burned off under controlled (rate of oxygen into the furnace is limited) or uncontrolled (air furnace) conditions to produce a mantle type structure composed of ceramic fibers, emissive burner structures, sponge type structure, as well as similar ceramic elements made up of a variety of pure or mixed oxides depending on the photon emissions desired, as previously described in several patents by this author, e.g., U.S. Pat. Nos. 4,776,895, 4,793,799, and 4,906,178, and are herein incorporated by reference.

The shock resistance of these structures such as mantles depends on shape and size as well as the precursor structure, weight and porosity, as well as the process of manufacture and mounting. Several methods of measuring shock have been described in the literature (Durand Technical Report AFATL-TR-69115, pp 1–40 (1969) and Ives et al, Journal Of The Franklin Institute, Vol. 186 (Oct. & Nov. 1918) and are herein incorporated by reference. The use of strengthening agents such as aluminum oxide, yttrium oxide and beryllium oxide is well known. In addition, this author has described a method of producing very strong ceramic fiber selective emitters by coating single and multi crystal alumina as well as fused silica, garnets, rare earth silicates, thoria glasses as well as other transparent low emitting materials. It is also practical to weave some of these low emitting strong ceramics into the precursor structure to obtain a super strong mantle capable of withstanding shock loads of greater than 800 g's. To make these structures, such as mantles, even stronger and to create the desired emissive properties, a coating of organometallic material containing a selective emitter may be applied to the structure, including composite structure members such as alumina, YAG, thoria, boron nitride, hafnia, etc.

Preferred gas mantle structures are composed of oxides of at least one rare earth metal oxide fibrous system manufactured by the above process, e.g., ytterbia, hafnia with ytterbia or other rare earth emitter, erbia, holmia, thullia, neodymia, and mixtures thereof, ceria 1 to 3% and thoria, scandia or yttria or mixtures thereof. Shapes may be conventional gas light domes, spherical, geodesic domes, cylinders, parabolic, and any other structurally sound geometry such as 3-dimensional emissive burner matrixes.

Another embodiment of this invention utilizes a partially pyrolyzed precursor, which is then imbibed with a refractory metal compound or mixture of compounds to produce the desired spectral emittance. The imbibing solution consists of metal nitrates, halides, and mixtures thereof, hydroxides, organometallic compounds and mixtures of the above. The nitrates are reduced to hydroxides in one process option. The use of ammonia gas is an alternative to reducing nitrates in a controlled oxygen environment with slowly increasing temperature control. In another option, direct denitration can be accomplished using the partially pyrolyzed organic skeleton material as the reducing agent when the polymer contains ammonia type materials such as amine groups on the polymer or on a polymer coating.

The concentration of the imbibing solution may vary widely in the range of 0.1 to 5 molar, but preferably in the range of 1 to 4 molar. Thickening agent may be added to the solutions to form a slurry or mixture. Also a colloidal slurry may be used to coat the carbon skeleton after one or more imbibing cycles, followed by processing to oxide. In addition, a combination of impregnation with soluble salts and coating with insoluble compounds produces strong mantles and various three dimensional structures that are illustrated below.

In the preferred process the precursor substrate material is an organic textile or sponge or combination of the two in which the pores of these structure are interconnected. The substrate material is processed to a strong carbon structure in a very low or zero oxygen environment. Then the preferred hollow carbon fiber relic substrates (preferably woven and formed into a tow) are imbibed (filled with) and or coated with metal compounds (containing the appropriate ratio of emissive materials depending on the desired photon spectral output), after the excess liquid is removed, the precursor of the pyrolyzed relic is dried and prepared on a mandrel for the oxidation and conversion step. The pyrolyzed structure is stiffened by means of supporting members or stiffening chemicals before it is heated to a temperature that will convert the metal compound to a hydroxide or oxide.

Once that temperature is reached, oxygen is slowly fed into the chamber to oxidize the carbon to CO and $CO_2$ in a manner that prevents a fire. When the carbon has been oxidized away, the temperature is increased to about 1500 to 2000° C. to densify the ceramic structure. The higher the temperature of this firing the less shrinkage will occur later in operation and therefor the better the product for high temperature applications; however, the flexibility of the ceramic matrix is reduced at higher temperatures.

In the case of the sponge type structures, the open pores should be uniform and interconnected so that the liquid can easily fill the openings without leaving air pockets or defects. This can be accomplished by pressure and enhanced by reducing the resistance to flow by means of a surfactant such as Triton x or Triton 100.

The resulting metal oxide structures have greater strength than those in the prior art because they have far fewer defects. The key to reducing defect density is the filling of the holes or spaces uniformly and a means to minimized solvents that could leave space where defects can form. The removal of solvent from the first impregnation step does leave some defects; however, these holes or spaces are filled by second step impregnation which can be done under pressure with little solvent or can be done with the metal in a gas or liquid state, thus leaving a zero defect structure.

Without the intent to be limited by the same, the theory and mechanism of this process appear to be as follows. When the fabric of organic polymeric material, such as silk, rayon, polyester, cotton or cellulose or mixture thereof, is pyrolyzed and then immersed in a solution or slurry (or both in the proper order, soluble solution first) of metal oxide-forming compounds (upon heating in an oxidizing atmosphere), the metal compound enters the empty spaces and/or coats the substrate carbon relic. Upon drying, the metal compounds in the empty spaces are separated into segments which are not necessarily connected everywhere. Therefore, multiple immersion of the metal compounds or immersion under pressure may be needed to connect each segment after drying and repeating two or more times.

Then the heating of the impregnated carbon skeleton under controlled conditions converts the metal compounds to an oxide structure that is a negative replica of the relic precursor material. The oxide negative may have defects which can be further healed by coating with a solgel polymer with appropriate viscosity or by heating to higher temperatures. In addition, the defects can be remedied by interrupting the heating and imbibing or coating the structure with metal compounds to fill any voids or defects such as a microcrack with organometallic material. These organometallic materials may be incorporated into a liquid carrier and applied to the early cycle oxide structure.

Additionally, the structure can further be imbibed and or coated with a solution of rare earth containing materials to fill voids which upon refiring to a higher temperature fill a larger portion of the void space and defects such that the shrinkage is reduced to less than 18%. Gases produced when the carbon is oxidized are released through some of these microcracks that can be healed upon high temperature firing. Because the carbon oxidizes primarily from the outer surface of a hollow carbon structure filled with the metal compound(s) the microcracks density is greatly reduced from the prior art which must release its gases though a porous structure. Therefor, this process produces far stronger structures. In the case where the carbon structure is hollow, the carbon is oxidized from the outside the defects are present where the solution or slurry penetrated the carbon tube or nanotube. Therefore the partial oxidation of the carbon will allow a second or third penetration to fill all of the holes or spaces that could create defects, but don't because as the final heating takes place the defects heal. After complete decarbonization, additional solution or slurry may be added to the porous ceramic structure to enhance bonding and strength.

The process has the advantage that minimal shrinkage takes place during the removal of the carbon. The following process is therefor very useful in producing selective photon emitters such as ytterbia with narrow band emission at 980 nm plus or minus about 150 nm and erbia at 1550 nm plus/minus 100 nm. and holmia 2000 nm plus/minus 150 nm. These emitters are structurally sound and may be used to produce photons as in a gas light system in with emissions in the selected wavelength region simply by replacing the gas light mantle with the stronger selective emitting mantle. Because these emitters have regions of emission off the primary band, further selectivity may be enhanced using various types of optical filters. For example to remove any visual light, a filter that reflects the visible but passes infrared may be employed. In addition, band pass filters to pass 980 nm plus/minus 25 nm, 1500 nm plus/minus 25 nm, 2000 nm plus/minus 25 nm may be employed to pump lasers. In addition, far infrared emission from above 2.5 micron may be reflected to the emitter to save energy or raise the temperature of the emitter by means of filters such as interference, plasma, or gold dipole type filters.

The metal oxide matrix formed by this process is an object with a similar appearance as the black carbon structure, but appears white, pink or orange for ytterbia, erbia and holmia, respectively. In some case the structure will be very slightly smaller than the carbon structure. Some structures are made with less than 30% shrinkage. Advanced emissive matrix structures can be produced that can withstand repeated thermal cycles to above 2000 degrees C.

BRIEF DESCRIPTION OF THE DRAWINGS

Other features and advantages will be seen as the following description of particular embodiments progress as illustrated and describe in the following drawings:

FIGS. 1a, 1b, 1c and 1d: Gas light dome structure of carbon, impregnated, and final fired.

FIG. 3: Concentric cylinder form of an emissive matrix structure.

FIG. 4: Spiral cylinder emissive matrix structure.

FIG. 5a: Recuperative burner

DETAILED DESCRIPTION OF THE INVENTION

Figure 2:
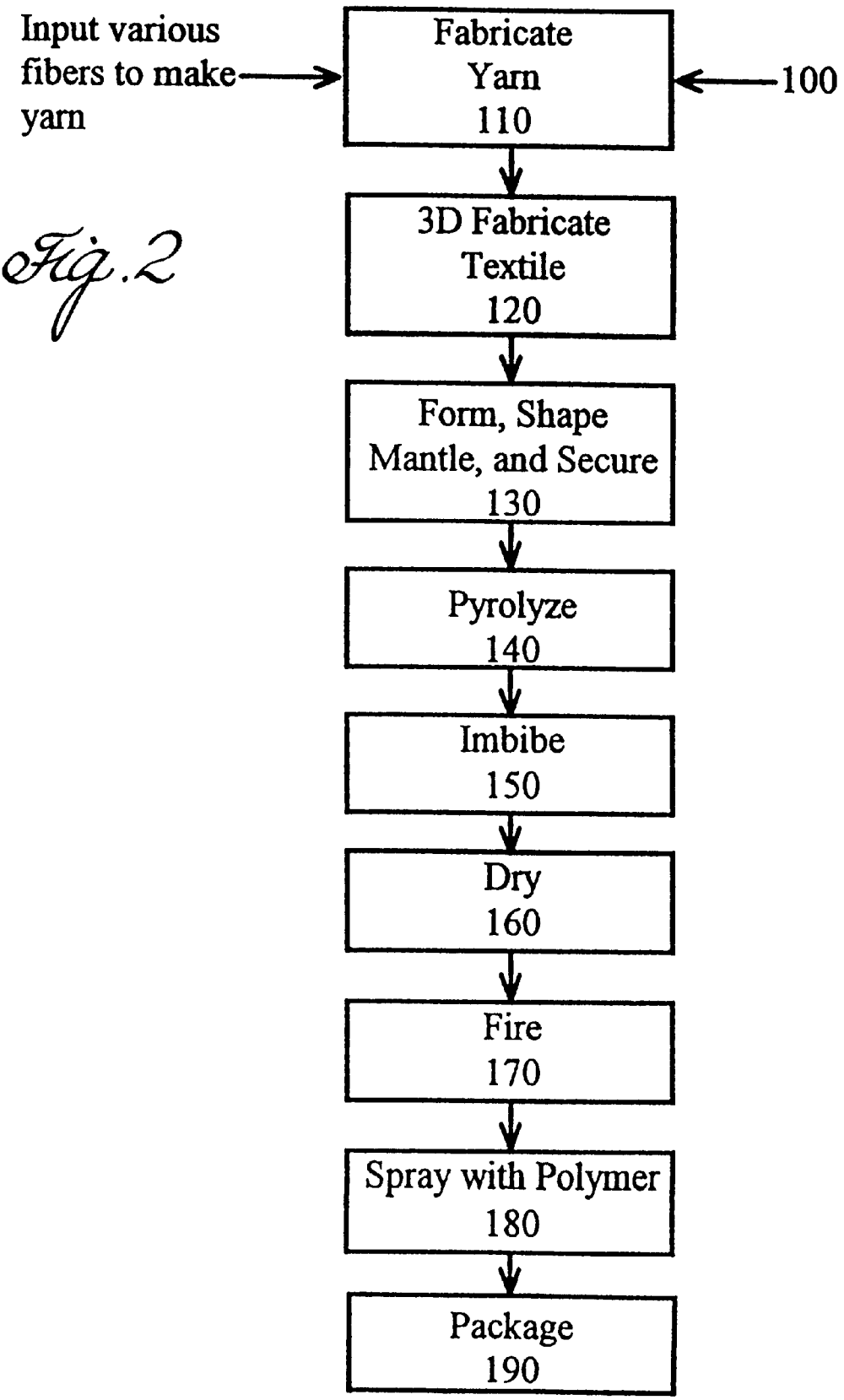
FIG. 2: Schematic block diagram of the process.

The fiber yarn may be prepared as is done for a variety of composite materials, i.e., a mixture of organic fibers such as rayon, silk, KEVLAR, carbon nanotubes and other materials may be mixed to form a yarn, the yarn is woven, braided, or otherwise formed into an emissive structure that when converted to a ceramic structure will efficiently transfer energy from hot gases or flames to emit radiation of a predetermine spectral distribution.

Alternatively, alumina or other ceramic fibers may be mixed with one or more organic fibers to yield a composite yarn 8 as shown in FIG. 1a. The composite yarn 8 is formed onto a support structure such as the ceramic ring 20, which in turn is connected to the fuel-oxidizer inlet 30. The mantle system 10 is then pyrolyzed in an reduced oxygen or zero oxygen environment, leaving a strong carbon structure which may alternately contain one or more ceramic fibers such as the desired ceramic emitter or a low emissivity structure material such as alumina, YAG, or other high temperature structural fiber that will not seriously affect the selected emissions of the final desired mantle or other emissive structure. Pyrolysis is typically at temperatures in the range of from about 400 to 1000° C. depending on the organic material being pyrolyzed.

After the pyrolysis step the mantle or other structure 8 is placed in a solution or mixture of selected emitter forming compounds as shown in FIG. 1b. The emitter system to be is held by the fuel oxidizer tube 30 and immersed just below the support means 20, as shown. The imbibing solution or mixture 40 is contained in a chamber 50. After imbibing, the system 10 is removed and the excess liquid is removed by gravity, gentle drying by heat or vacuum, or centrifuge and the system is place with in a furnace 60. The system may be supported in the furnace 60 by a hook 70. The carbon structure is gradually oxidized to carbon monoxide and carbon dioxide as the precursor chemicals are converted to the oxides. The oxide takes on a shape resembling the fibrous structure of the carbon precursor. This process shrinks imbibed emissive structures much less than conventional relic method structures, and thus produces a stronger and more shock resistant mechanical structure.

The flow chart 100 of this process is schematically illustrated in FIG. 2. The yarn or composite tow is fabricated in step 110 and the further fabricated into a shape such as a textile sock in step 120, and then the fabric is formed into an emissive element shape such as a mantle and secured onto some support means in step 130, and then the structure is pyrolyzed in step 140, and then imbibed in step 150, and then dried in step 160, and then fired in step 170, and then a coating of polymer is applied to enhance strength and flexibility before usage in step 180 and the emissive structure is packaged in the final step 190.

FIGS. 3 and 4 illustrate two of the possible emissive burner matrix structures that can be fabricated by the process. FIG. 3 illustrates the use of four screen type cylinders 311, 321, 331 and 341, respectively, starting from the outside and moving inward to form the concentric cylinder matrix structure 300. The flame is stabilized on the emitter along the axis of the concentric cylinders. The fuel and air are premixed and distributed through a distribution layer (not shown herein, but described in detail in the patent and applications mentioned above). Each of the cylinders may be supported by heat resistant solid rings 310, 320, 330, and 340, respectively. One cylinder is placed inside the other to form the emissive matrix structure that will emit a very uniform photon flux at a selected wavelength region. A support ring is optional at the bottom of 311.

The object in FIG. 4 also illustrates a very uniform photon emitting structure 400 which is made by fabricating the sock or screen like textile shape 411 onto a coil support 410 such as a ceramic coil. Additional support elements 465 may be added to enhance strength, and are preferably made from high temperature, low emissivity materials that are coated with superemitters which emit the appropriate wavelengths of photons when heated.

A log cabin like structure made from pyrolyzed felt may also be employed. The carbon felt structure for a log cabin structure is imbibed with compounds of ceramic forming precursors and then processed according to the flow chart in FIG. 2. This log cabin forms an emissive structure which, if made up of selective emitting substances, provides a very strong, high density superemitter. The photons from this selected emitter reach over 25 watts/sq cm in the region of interest and can be converted to electricity by means of photovoltaic (PV) arrays.

FIG. 5a illustrates the use of a organic foam system that is foamed around a ceramic or metal structure and then a series of rayon or other fibers are woven into the surface to produce a brush like effect. The transparent plate 595 on the front near the photovoltaic (PV) cell prevents combustion products from coming in contact with the PV cells. The combustion products 585 are forced through the ceramic foam or composite foam structure 584 to form a recuperator burner emitter in one simple structure.

Figure 7:
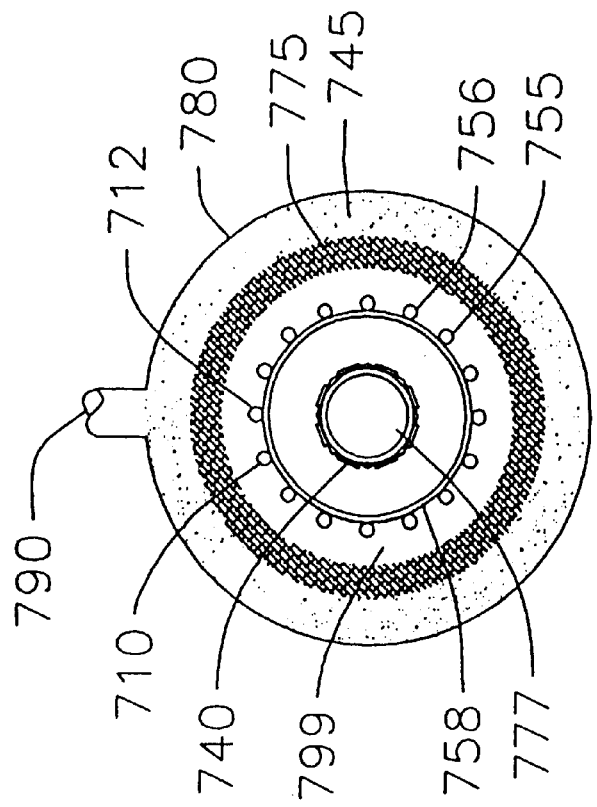
FIGS. 6 and 7: Thermophotovoltaic systems employing the invention.
Figure 6:
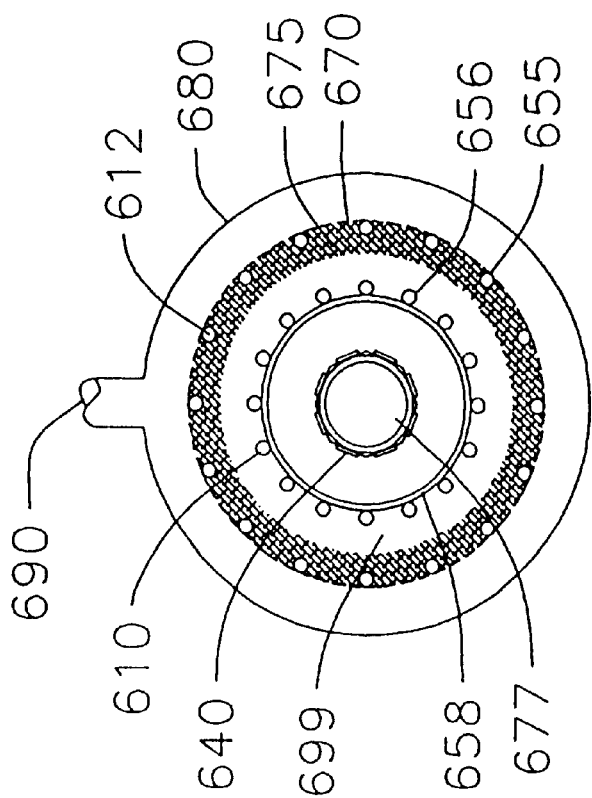

FIGS. 6 and 7 illustrate thermophotovoltaic systems which can be made by the process. In FIG. 6 the fuel and air may be mixed stoichometrically and inserted into the full face injectors, inner 610 and outer 612. The flame heats the emissive structure 675 both from within by means of 610 and from the outside by 612. The inner injector 610 can be made of a transparent high temperature material such as fused silica or alumina. In addition, to reduce the tendency for flash back and to allow more recuperation, i.e., higher temperature preheat, the tubes may contain alternately one rich in fuel and the other rich in oxidizer. Cylinder 658 may be a transparent high temperature material shield to prevent combustion product contact of the PV array 640. The superemissive fiber system may be supported by a high temperature material 670 such as ceramic or superalloys such as Inconel. There is insulation or space for a recuperator in location 655 which can be contained by structural member 680 which can be cooled by air or water (not shown). The exhaust may exit through an exhaust port 690.

FIG. 7 illustrates another typical full face injector design that may use either mixed fuel and oxidizer, or fuel rich alternated with oxidizer rich streams. The tubes 710 and 712, respectively, are preferably transparent. As in FIG. 6 the center contains the PV array 740 which is cooled by means 777 such as water, other fluid or air. The matrix fibers 775 are heated by the flame from the full face injectors 710, 712. The space 787 between the PV cells 740 and the heat shield 758 is also available for cooling or preheating the oxidizer or fuel.

A recuperator (not shown) may be contained in the area labeled 745 which is contained by outer structure 780 and the exhaust exits through a port 790. The spectra from these type of full face injectors have been shown to be very narrow and intense as compared with a well stirred reactor.

A composite structure can be formed comprising a structural ceramic oxide that has a low emissivity and a very strong tensile and flexural strength and at least one organic polymer to form a porous structure. This polymer in the composite is pyrolyzed to form a composite relic consisting of carbon and a low emissivity material. The carbon and ceramic composite is imbibed with precursors containing metal compound(s) that when converted to the oxide(s) provide a selected emission of photons with over 40% of its photons in regions of the spectra up to a couple of hundred nm wide over a range of 1000 nm to 4000 nm. The imbibing solution may consist of rare earth nitrates in, for example, a concentration of about 0.1 to 1 gram weight per ml of water. Other rare earth compounds such as chlorides and organic salts can be employed. Even colloidal suspensions of rare earth materials or solgels may be used.

The solution may also use an organic solvent to facilitate imbibing hydrophobic polymers such as Teflon and polyethylene as well as carbon structures. For example, Teflon may be mixed with the carbon fibers to facilitate bonding by dispersion of nanotube whiskers in a solvent with a fine Teflon powder, polyethylene powders, or other matrix forms and a porosity agent. Then the material is mixed and vacuum formed onto a porous structure such as a screen or ceramic foam. The material system is then partially pressed and the Teflon is sintered at about several hundred degrees centigrade to remove the Teflon and porosity agent. The resulting structural member is imbibed and later the carbon support skeleton is oxidized to form a selective emitting ceramic structure.

The invention is by no means limited to structures that emit selected photons upon heating, but can be used for almost any ceramic structure. Other structural high temperature parts can be fabricated using cloth, paper, foamed polymers, and composite structures. These parts can be used in furnaces, engines, hot gas streams, as well as any other high temperature or corrosive environment.

What is claimed is:

1. A method for forming a relic burner comprising the steps of:
   forming a replica of a desired burner structure from organic material;
   pyrolyzing the replica in substantial absence of oxygen for producing a carbon replica of the organic material;
   imbibing the carbon replica with a salt or oxide of a metal;
   drying the imbibed carbon replica; and
   heating the carbon replica in presence of oxygen to a sufficient temperature for removing the carbon, leaving a metal oxide relic of the organic material.

2. A method according to claim 1 wherein the metal is a superemitter.

3. A method according to claim 1 wherein the metal is a rare earth metal.

4. A method according to claim 1 wherein the organic material comprises fibers formed into a mantle.

5. A process for fabrication of an advanced emissive matrix comprising the steps of,
   fabricating a three dimensional structure of which a major portion comprises organic polymers,
   pyrolyzing the structure under controlled atmospheric condition to produce a primarily carbon structure,
   imbibing the carbon containing structure with solution containing metal salts,
   drying the solvent in the solution,
   further heating the imbibed structure to remove the carbon slowly and form a metal oxide or hydroxide structure while preventing damage to the structure, and
   heating to a higher temperature to heal voids and defects during a phase where the structural elements of the structure are reduced in size and increased in density.

6. A process as in claim 5 wherein the advanced emissive matrix comprises a cylindrical structure which upon heating with a fuel oxidizer mixture stabilizes the combustion to produce a nearly uniform radiation profile over an axis of the cylindrical structure.

7. A process as in claim 5 wherein the advanced emissive matrix comprises a structure which is optically thin.

8. A process as in claim 5 wherein the metal oxide or hydroxide structure is further imbibed and or coated with solution of rare earth containing materials to fill voids which upon refiring to a higher temperature fill a larger portion of the void space and defects such that the shrinkage is reduced to less than 18%.

9. A process as in claim 5 wherein the imbibing solution is made by dissolving rare earth nitrates which are then reduced with ammonia gas.

10. A process as in claim 5 wherein the imbibing solution comprises an organometallic compound and a solvent.

11. A process as in claim 11 wherein the imbibing solution comprises both inorganic and organic compounds.

12. A process as in any of claims 5–11 in which the metal is selected so that the advanced emissive matrix structure obtained can withstand repeated thermal cycles to above 2000 degrees C.

* * * * *